United States Patent
Stepanian et al.

(10) Patent No.: US 11,260,311 B2
(45) Date of Patent: Mar. 1, 2022

(54) RESISTANCE CONTROL SYSTEMS AND METHODS FOR AMUSEMENT ATTRACTIONS

(71) Applicant: Universal City Studios LLC, Universal City, CA (US)

(72) Inventors: Mark Allan Stepanian, Alexandria, VA (US); Jordan Dillon Barner, Arlington, VA (US); Tyler James Blankenship, Fairfax, VA (US); David Boback Moghaddam, Arlington, VA (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/929,066

(22) Filed: Jul. 14, 2020

(65) Prior Publication Data

US 2021/0052990 A1 Feb. 25, 2021

Related U.S. Application Data

(63) Continuation-in-part of application No. 16/687,354, filed on Nov. 18, 2019, now Pat. No. 11,033,829.

(Continued)

(51) Int. Cl.
*A63G 31/16* (2006.01)
*G06F 3/01* (2006.01)
(Continued)

(52) U.S. Cl.
CPC ............. *A63G 31/16* (2013.01); *A63G 31/14* (2013.01); *G06F 3/011* (2013.01); *G06F 3/016* (2013.01)

(58) Field of Classification Search
CPC ........ A63G 31/00; A63G 31/04; A63G 31/16; G09B 9/00; G09B 9/12; G09B 9/14
(Continued)

(56) References Cited

U.S. PATENT DOCUMENTS

| 1,509,750 A | 9/1924 | Campbell |
| 5,364,271 A | 11/1994 | Aknin et al. |

(Continued)

FOREIGN PATENT DOCUMENTS

| EP | 0140306 A2 | 5/1985 |
| WO | 2011064560 A1 | 6/2011 |
| WO | 2014113548 A1 | 7/2014 |

OTHER PUBLICATIONS

PCT/US2020/047239 International Search Report and Written Opinion dated Nov. 3, 2020.

(Continued)

*Primary Examiner* — Kien T Nguyen
(74) *Attorney, Agent, or Firm* — Fletcher Yoder, P.C.

(57) ABSTRACT

A resistance control system for a passenger support of an amusement attraction includes a first foundation, a second foundation, and a support extending between the first foundation and the second foundation. The second foundation is pivotably coupled to the support at a pivot joint. The resistance control system also includes a motor and a linkage system coupled to the motor and to the second foundation such that the motor is configured to output a torque to adjust, via the linkage system, a resistance to movement of the second foundation about the pivot joint and relative to the first foundation.

20 Claims, 9 Drawing Sheets

Related U.S. Application Data

(60) Provisional application No. 62/889,943, filed on Aug. 21, 2019.

(51) Int. Cl.
*A63G 31/14* (2006.01)
*G09B 9/02* (2006.01)

(58) Field of Classification Search
USPC ................. 472/59–61, 130; 434/55
See application file for complete search history.

(56) References Cited

U.S. PATENT DOCUMENTS

| | | | |
|---|---|---|---|
| 5,583,844 A | 12/1996 | Wolf et al. | |
| 6,024,647 A | 2/2000 | Bennett et al. | |
| 6,445,960 B1 * | 9/2002 | Borta | G09B 9/02 434/30 |
| 6,634,885 B2 * | 10/2003 | Hodgetts | G09B 9/12 434/29 |
| 6,733,293 B2 * | 5/2004 | Baker | G09B 9/08 434/55 |
| 6,776,722 B2 | 8/2004 | De-Gol | |
| 7,535,344 B2 | 5/2009 | Obradovich | |
| 7,950,333 B2 | 5/2011 | Crawford et al. | |
| 9,353,903 B2 | 5/2016 | Kang et al. | |
| 9,782,683 B2 | 10/2017 | Lee | |
| 10,053,138 B2 | 8/2018 | Foster et al. | |
| 2009/0163283 A1 | 6/2009 | Childress | |
| 2014/0157916 A1 | 6/2014 | Vatcher et al. | |
| 2017/0266572 A1 | 9/2017 | Petrov | |

OTHER PUBLICATIONS

PCT/US2020/047245 International Search Report and Written Opinion dated Nov. 3, 2020.

* cited by examiner

RESISTANCE CONTROL SYSTEMS AND METHODS FOR AMUSEMENT ATTRACTIONS

CROSS REFERENCE TO RELATED APPLICATION

This application is a continuation-in-part of U.S. application Ser. No. 16/687,354, filed Nov. 18, 2019, and entitled "RESISTANCE CONTROL SYSTEMS AND METHODS FOR AMUSEMENT ATTRACTIONS," which claims benefit of U.S. Provisional Application Ser. No. 62/889,943, filed Aug. 21, 2019, and entitled "RESISTANCE CONTROL SYSTEMS AND METHODS FOR AMUSEMENT ATTRACTIONS," all of which are hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various amusement attractions have been created to provide riders with unique motion and visual experiences. In some cases, an amusement attraction may include a ride vehicle and a ride track (or other path) along which the ride vehicle moves. In an increasing number of amusement attractions, the ride vehicle may not traverse a path. For example, the vehicle may be configured for roll, pitch, and/or yaw while remaining fixed to a location. Such vehicles may be referred to as stationary vehicles. For both stationary vehicles and those that traverse a path, virtual reality (VR) devices are being employed to provide additional excitement. It is now recognized that it is desirable to provide riders with the ability to control certain aspects of these rides and/or associated VR experiences to increase excitement and immersion in the ride experience. For example, it is now recognized that it is desirable to provide users with the ability to steer the ride vehicle or at least be given the perception, via the VR devices, that they are steering the ride vehicle.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Present embodiments are directed toward a resistance control system for a passenger support of an amusement attraction that includes a first foundation, a second foundation, and a support extending between the first foundation and the second foundation. The second foundation is pivotably coupled to the support at a pivot joint. The resistance control system also includes a motor and a linkage system coupled to the motor and to the second foundation such that the motor is configured to output a torque to adjust, via the linkage system, a resistance to movement of the second foundation about the pivot joint and relative to the first foundation.

Present embodiments are directed toward a resistance control system for a ride vehicle of an amusement attraction that includes a first foundation, a second foundation coupled to a pivot joint and configured to move relative to the first foundation via the pivot joint, a motor configured to drive movement of the second foundation via a linkage system, and a controller communicatively coupled to the motor. The controller is configured to receive an input and to instruct the motor to output a torque based on the input to adjust a resistance to movement of the second foundation about the pivot joint and relative to the first foundation.

Present embodiments are directed toward an amusement attraction that includes a virtual reality (VR) device having a VR controller that is configured to instruct the VR device to present an image and a ride vehicle that has a first foundation, a second foundation, and a support extending between the first foundation and the second foundation. The support is pivotably coupled to the second foundation via a pivot joint such that the second foundation is configured to move relative to the first foundation via the pivot joint. The ride vehicle also includes a motor configured to drive movement of the second foundation relative to the first foundation via the pivot joint or a linkage system coupled to the second foundation. The amusement attraction further includes a vehicle controller communicatively coupled to the VR controller and to the motor. The vehicle controller is configured to instruct the motor to output a torque based on communication between the vehicle controller and the VR controller.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
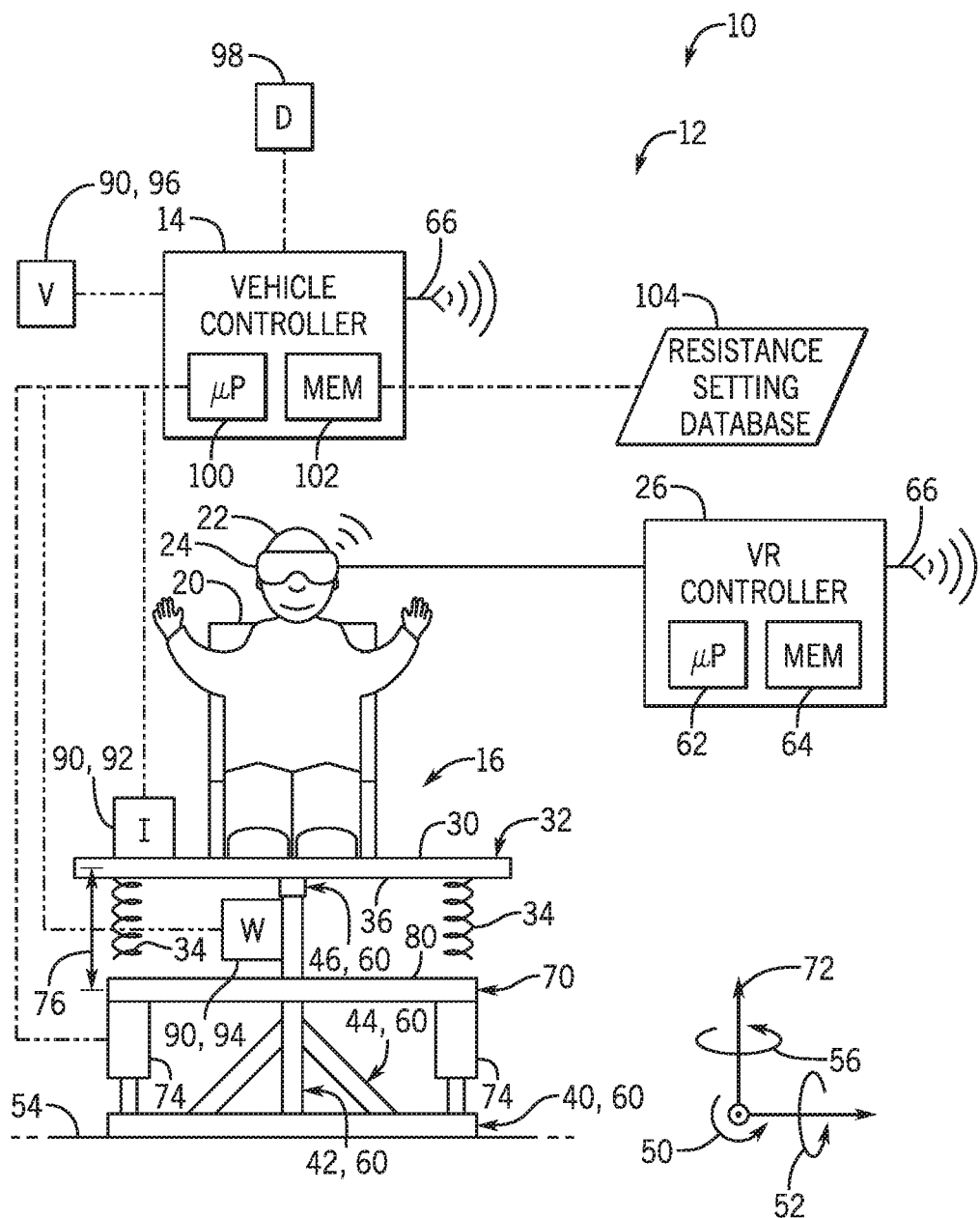
FIG. 1 is a schematic diagram illustrating an embodiment of an amusement attraction having a resistance control system and a stationary ride vehicle to enhance an experience of a rider equipped with a virtual reality (VR) device, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are directed to a resistance control system for an amusement attraction, such as an attraction in which a rider is equipped with a virtual reality (VR) device of a VR system. Generally, the rider provides input to the VR system of the stationary attraction by leaning or shifting his or her weight relative to a ride vehicle positioned underneath the rider. The ride vehicle includes supports that are tensioned, engaged, or otherwise imparting a force to appropriately resist the movement to simulate a virtual experience, such as riding a horse or steering a paraglider, which is delivered through the VR device. As discussed herein, the resistance control system enables selective adjustment of a resistance of the ride vehicle to movement, thus providing a particular (e.g., similar) experience to people of varying weights and/or enabling a wide range of rider preferences or factors to be accommodated on the stationary attraction, for example.

The ride vehicle of the resistance control system generally includes rider accommodations, such as a chair or seat, coupled to a spring plate. In certain embodiments, the spring plate is supported by a structural joint (e.g., universal joint) that enables riders to pitch and roll the spring plate with their bodyweight. Notably, springs are engaged with, or coupled to a surface of, the spring plate to selectively contact an actuator plate disposed underneath the spring plate. The actuator plate is vertically positioned relative to the spring plate via actuators, thus enabling the springs of the spring plate to compress and provide stability during pitch and roll motions of the spring plate. The actuators may move the actuator plate up or down to respectively increase or decrease resistance of the resistance control system to movements of the rider. Thus, during a normal ride cycle, the resistance control system may measure a weight of the rider or other parameter and instruct the actuators to change the tension of the springs to a predetermined setting or effective spring constant accordingly. In other embodiments, compound or conical springs coupled to the spring plate may be passively compressed by the rider to a target height and secured with ratcheting devices, thereby providing a target resistance to movements of the rider.

In further embodiments, the resistance control system may provide a resistance of movement via control of a motor. For example, the motor may be coupled to the spring plate via a linkage, and the motor may be configured to impart a torque onto the spring plate to increase resistance to movement of the spring plate (e.g., relative to the actuator plate). Further, the motor may be back-driven by a force imparted by the user, such as via their bodyweight, onto the spring plate, in order to enable the user to move (e.g., pitch and roll) the spring plate. Accordingly, the motor may increase or reduce the output torque in order to increase or reduce the resistance of movement of the spring plate, respectively. For instance, the resistance control system may adjust the torque output based on the bodyweight and/or a preference of the user to change the resistance of movement of the spring plate. Further, the resistance control system may cause the motor to output a torque that actively drives movement of the spring plate. In any case, the resistance control system provides an improved experience for guests as compared to that of entirely passive systems and/or entirely active systems.

As illustrated in FIG. 1, an amusement attraction 10 includes a resistance control system 12 having a vehicle controller 14 (e.g., controller) and a ride vehicle 16 (e.g., a motion simulator). The present embodiment of the amusement attraction 10 illustrates the ride vehicle 16 having a seat 20 from which a rider 22 may steer the ride vehicle 16 and receive a virtual experience, which is supported by a VR device 24 (e.g., VR headset, wearable visualization device) having a VR controller 26. In other embodiments, the VR device 24 is not included and additional excitement is added by the resistance control system 12 without VR effects. It should be understood that the ride vehicle 16 may take any suitable form, such as one including a sled, a motorcycle, an animal, a surfboard, a skateboard, and so forth. Although the resistance control system 12 is discussed herein with reference to a single rider 22, it should be understood that similar techniques may be applied to adapt the resistance control system 12 for multi-passenger ride vehicles.

In the present embodiment, the seat 20 is coupled to a top surface 30 of a spring plate 32 of the ride vehicle 16, and springs 34 are engaged with or coupled to a bottom surface 36 of the spring plate 32. It should be noted that the spring plate 32 may be a frame or framework and not a solid plate, in other embodiments. Further, it should be noted that other features or components, such as a motor and/or a linkage (e.g., a linkage system), may be used for providing resistance of movement of the spring plate 32 relative to the remainder of the ride vehicle 16. The ride vehicle 16 includes a base 40 that is coupled to a support beam 42 via struts 44, in the present embodiment. The support beam 42 is also coupled to the bottom surface 36 of the spring plate 32 via a pivot joint 46. The pivot joint 46 of the present embodiment enables the spring plate 32 to rotate via roll 50 and pitch 52 relative to the base 40. The base 40 is generally stationary relative to a ground surface 54 in the illustrated embodiment. However, in other embodiments, the base 40 may be part of a larger vehicle that traverses a path (e.g., a track). In some embodiments, the pivot joint 46 may be a spherical bearing joint or universal joint that also enables rotational movements 56 of the spring plate 32 about an axis that is parallel a vertical axis 72 (e.g., yaw movement). In other embodiments, the pivot joint 46 may enable movement along a single axis (e.g., corresponding to a single degree of freedom), which may be suitable for simplified amusement attractions 10. For example, to provide rotation around the single axis, the pivot joint 46 may be a gimbal or a hinged gimbal expansion joint. In any case, the base 40, the support beam 42, and the pivot joint 46 generally form a support assembly 60 that supports the spring plate 32 while allowing any suitable degrees of freedom of pivotal movement of the spring plate 32.

The VR device 24 worn by the rider 22 implements VR techniques to render an interactive virtual experience within eyesight of the rider 22. For example, the VR controller 26 may instruct a display of the VR device 24 to generate a target set of virtual images corresponding to the interactive virtual experience via a processor 62 and a memory 64. In some embodiments, the VR techniques include augmented reality techniques as well. As illustrated, the VR controller 26 of the VR device 24 is communicatively coupled to the vehicle controller 14 via a wireless communication component 66. In other embodiments, the VR controller 26 may be communicatively coupled to the vehicle controller 14 via any suitable components that form a communication connection, such as a wired connection, a BLUETOOTH® connection, a Wi-Fi connection, and so forth. It should be understood that the virtual experience provided through the VR device 24 may be selected to correspond with a physical appearance of the ride vehicle 16 and/or a theme of the amusement attraction 10, in some embodiments. For example, in embodiments in which the amusement attraction 10 is themed as a jungle, the seat 20 of the ride vehicle 16 may be designed as an animal, and the virtual experience may be displayed to the rider 22 as a race through the jungle. Such cohesive designing of components of the amusement attraction 10 may provide a consistent and immersive experience to the rider 22. In other embodiments, the VR device 24 may be replaced with an augmented reality device. Moreover, it should be understood that the resistance control system 12 may be implemented in any suitable environment in which a semi-passive resistance control framework enhances user experience (e.g., an interactive movie theater or a motion-based ride).

Looking to resistance-adjusting features of the resistance control system 12 in more detail, the ride vehicle 16 includes an actuator plate 70 positioned between the spring plate 32 and the base 40, relative to the vertical axis 72. As with the spring plate 32, the actuator plate 70 may be a framework and does not necessarily include a solid plate. In the present embodiment, actuators 74 are coupled between the actuator plate 70 and the base 40 to adjust a position of the actuator plate 70 based on instruction from the vehicle controller 14. In other words, the actuators 74 are instructed to contract or extend to any suitable actuator length, between a fully contracted length and a fully extended length, to position the actuator plate 70 at a particular separation distance 76 from the spring plate 32. The actuators 74 may be any suitable components that facilitate movement of the actuator plate 70, including electric actuators, hydraulic actuators, pneumatic actuators, magnetic actuators, mechanical actuators, and/or servo motors, and so forth. It should be understood that in the present embodiment, the actuator plate 70 is not directly coupled to the spring plate 32.

As mentioned, the springs 34 are coupled to the bottom surface 36 of the spring plate 32, and further, may selectively compress against contact the actuator plate 70 in response to movements of the rider 22. For example, when the rider 22 leans to shift his or her weight relative to the support beam 42, the pivot joint 46 enables the spring plate 32 to tilt accordingly, thus disposing a corresponding portion of the springs 34 in contact (e.g., engaged) with a top surface 80 of the actuator plate 70. In response to continued weight shifting or engagement, the portion of the springs 34 that is in contact with the top surface 80 compresses and provides resistance to slow and eventually stop the movement of the spring plate 32. As recognized herein, by adjusting the separation distance 76 between the spring plate 32 and the actuator plate 70, the resistance control system 12 may effectively tune the ride vehicle 16 to provide a feeling of neutral buoyancy to the rider 22 that is suited for any one of multiple VR experiences delivered by the VR device 24.

Moreover, although two springs 34 and two actuators 74 are illustrated for simplicity, it should be understood that these are representative of any number of such features. In accordance with present embodiments, any suitable number of springs 34 and actuators 74 may be included in the ride vehicle 16, including one spring 34 and/or one actuator 74. For example, in embodiments having a single actuator 74, the single actuator 74 may include any suitable four-bar linkage, scissor linkage, guide rails combined with wheels, or any other suitable linkage mechanism that enables the single actuator 74 to adjust the position of the actuator plate 70 in one or multiple dimensions, in accordance with the present techniques. Additionally, in embodiments having a single spring 34, the single spring 34 may be disposed at a central position corresponding to an expected center of mass of the rider 22. It should also be understood that the springs 34, which are illustrated as mechanical, helical, or coil springs in the present embodiment, may include or represent any suitable resistance devices in certain embodiments, such as gas springs, air springs, elastomers, leaf springs, stiff air bladders, conical spring washers (e.g., Belleville washers), gas struts, or magnetic repulsion assemblies, or any combination thereof. That is, any suitable device that applies a variable force as a function of a dimension of the suitable device is presently contemplated as a suitable component of the resistance control system 12.

Additionally, although illustrated with the springs 34 of the spring plate 32 separated from the actuator plate 70, in other embodiments, the springs 34 may be coupled between the spring plate 32 and the base 40 to provide a normalizing bias to the spring plate 32. Moreover, although discussed herein with reference to the springs 34 coupled to the spring plate 32, it should be understood that the springs 34 may be coupled at any suitable position in the ride vehicle 16 that enables selective engagement of the springs 34, including positions in which the springs 34 engage with any suitable surface of the actuator plate 70, via cantilever action or any other suitable force-distributing components. That is, the suitable position may be any suitable position from which the springs 34 are engaged in response to tilting of the spring plate 32 beyond a threshold angle. In some of these embodiments, one or both ends of the springs 34 may be coupled to the spring plate 32 and selectively compressed between the spring plate 32 and the actuator plate 70. In other embodiments, the springs 34 may alternatively be coupled to the top surface 80 of the actuator plate 70.

As illustrated, the resistance control system 12 also includes sensors 90 to collect suitable information related to the ride vehicle 16 and/or the rider 22 thereon. For example, the sensors 90 presently include an inclinometer 92 coupled to the spring plate 32 to sense an angle and a direction of incline, or position, of the spring plate 32. In some embodiments, the inclinometer 92 senses an incline of the spring plate 32 to a thousandth of a degree. In other embodiments, an accelerometer, a position sensor, and so forth may be additionally or alternatively coupled to the ride vehicle 16. Moreover, the sensors 90 of the resistance control system 12 include a weight sensor 94 that senses data indicative of a weight of the rider 22 and transmits the data to the vehicle controller 14. The weight sensor 94 is illustrated as coupled directly to the support beam 42 in the present embodiment, thus enabling the weight sensor 94 to sense an entire weight or force from the rider 22 that is directed through the support beam 42. In other embodiments, the weight sensor 94 may be positioned anywhere between the rider 22 and the base 40 of the ride vehicle 16, such as between the seat 20 and the spring plate 32.

In other embodiments, the weight sensor 94 may be omitted, and the ride vehicle 16 may include a user input device that enables the rider 22 to provide input indicative of a weight, a user profile, and/or another parameter indicative of a desired or target resistance setting. In an embodiment, the vehicle controller 14 may receive other data to control the ride vehicle 16. As an example, the vehicle controller 14 may include or be communicatively coupled to a visual or imaging sensor 96, which may read an identifier (e.g., a radio-frequency identification tag, a barcode) of a component associated with, such as worn by, the rider 22. For instance, the identifier may be uniquely associated with a user profile of the rider 22 and may be indicative of a setting (e.g., resistance) preference, a user history (e.g., previous experiences with the amusement attraction), or other aspects specifically related to the rider 22. Thus, the vehicle controller 14 may use the identifier in order to determine a desired or target resistance setting to be provided by the resistance control system 12. As another example, the vehicle controller 14 may include or be communicatively coupled to an input device 98 with which the rider 22 may interact in order to submit an input indicative of a desired resistance setting. To this end, the input device 98 may include a feature, such as a touch screen, a keyboard, an audio recognition component, a track pad, a dial, a button, a knob, a switch, or any other suitable feature, and the rider 22 may utilize the input device 98 to input a weight, an identifier, the desired resistance setting, and so forth. The vehicle controller 14 may then instruct the resistance control system 12 to adjust the position of the actuator plate 70 relative to the spring plate 32 based on the user input.

Proceeding to discussion of the vehicle controller 14, the vehicle controller 14 is generally responsible for controlling the ride vehicle 16 to provide a target distance between the spring plate 32 and the actuator plate 70, as well as for aligning rider experiences (e.g., physical movements of the vehicle 16) with the virtual experience delivered through the VR device 24. It should be noted that the VR device 24 may be representative of different and/or additional effects (e.g., flat screen displays and audio systems). The vehicle controller 14 may communicate with other components of the amusement attraction 10 and/or the resistance control system 12 via any suitable, respective communication circuitry (e.g., forming a wired or wireless network). In the present embodiment, the vehicle controller 14 is communicatively coupled to the VR controller 26 of the VR device 24, the actuators 74, the inclinometer 92, and the weight sensor 94. The vehicle controller 14 may be included in a housing or chassis of the ride vehicle 16, in some embodiments. In other embodiments, the vehicle controller 14 may be remote to the ride vehicle 16 and coordinate operation of multiple ride vehicles 16.

The vehicle controller 14 of the illustrated embodiment includes a processor 100 to provide instructions through respective wireless communication components 66 to the ride vehicle 16, as well as a memory 102 (e.g., one or more memories) that stores the instructions for the processor 100, as well as a resistance setting database 104. However, it is to be understood that any components can be suitably stored in and updated from any suitable location, such as within a cloud database. The processor 100 is any suitable processor that can execute instructions for carrying out the presently disclosed techniques, such as a general-purpose processor, system-on-chip (SoC) device, an application-specific integrated circuit (ASIC), or some other similar processor configuration. In some embodiments, these instructions are encoded in programs or code stored in a tangible, non-transitory, computer-readable medium, such as the memory 102 and/or other storage circuitry or device.

As will be understood, the resistance setting database 104 is a store of data having resistance settings that correlate a resistance of movement of the spring plate 32 based on data received from the sensors 90. Indeed, the resistance setting database 104 may correlate the data to a target actuator length (e.g., target length, length within a threshold range) for the actuators 74. The resistance setting database 104 therefore enables the vehicle controller 14 to appropriately move the actuator plate 70 to tension the springs 34 of the ride vehicle 16 for riders 22 associated with a wide range of factors. As an example, the resistance control system 12 instructs the actuators 74 to provide less resistance for lighter riders 22 and more resistance for heavier riders 22. As another example, the resistance control system 12 may instruct the actuators 74 to provide a resistance based on a requested resistance input by the rider 22 or otherwise indicated by the rider 22. In some embodiments, the resistance setting database 104 correlates the target actuator lengths to a signal received by the sensors 90, such as a raw output of the weight sensor 94 in volts. Such a correlation may improve privacy and/or reduce computational latency for the resistance control system 12 compared to embodiments that convert the raw output into a value, such as units of weight. The resistance setting database 104 may include a target actuator length for any suitable range of raw outputs and/or weights above a customizable lower weight limit, such as every 1 pound, 5 pounds, 10 pounds, and 50 pounds, for example.

In some embodiments, the resistance setting database 104 includes individualized target actuator lengths that correspond to a respective virtual experience, a respective rider age, a respective rider profile, and so forth. For example, in embodiments in which the virtual experience provided through the VR device 24 is a detail-oriented or challenging experience, the resistance control system 12 may implement relatively high resistance settings (e.g., 10% more tension) to provide more motion sensitivity to the ride vehicle 16. Additionally, in embodiments in which the resistance control system 12 determines that a rider profile of the rider 22 indicates a preference for a relaxed experience (e.g., relaxed VR gameplay), the resistance control system 12 may implement relatively low resistance settings and instruct the VR device 24 to provide a simplified virtual experience that suits the relatively low resistance settings. The resistance control system 12 of certain embodiments may also adjust the resistance of the ride vehicle 16 over a duration of a ride cycle of the amusement attraction 10, such as by increasing the resistance in response to determining that the ride cycle is nearing completion, that the rider 22 is entering a particular region of a simulated environment supported by the VR device 24, that the rider 22 has performed a certain task within the simulated environment, that the rider 22 has provided user input indicative of a requested resistance adjustment, and so forth.

Figure 2:
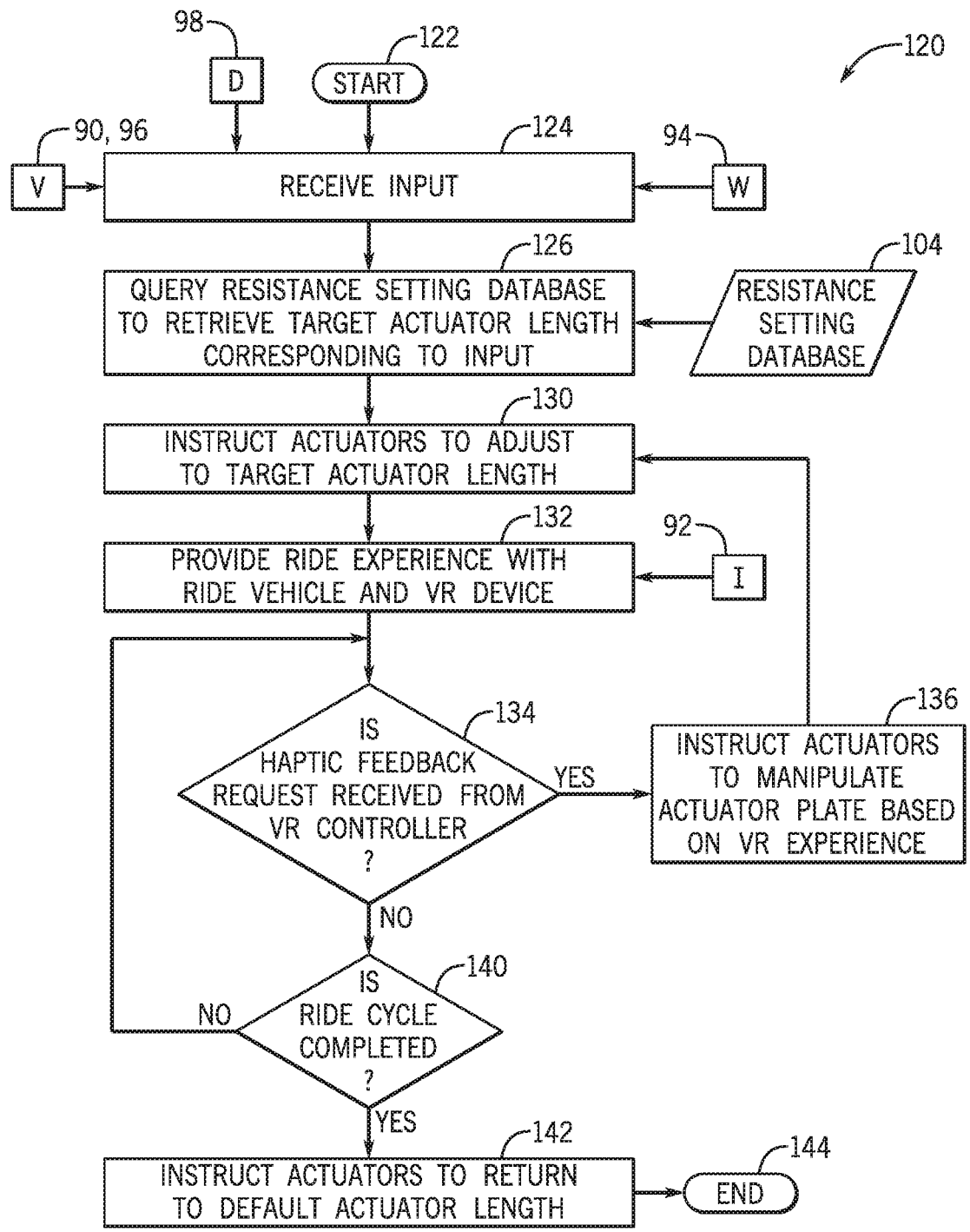
FIG. 2 is a flow diagram of an embodiment of a process by which the resistance control system may adjust a resistance of the stationary ride vehicle of FIG. 1, in accordance with embodiments of the present disclosure.

With the above features of the resistance control system 12 in mind, further discussion is provided herein regarding operation of the resistance control system 12 to regulate the weight resistance of, and enhance rider satisfaction on, the ride vehicle 16. For example, FIG. 2 is a flow diagram illustrating an embodiment of a process 120 that enables the resistance control system 12 to control the ride vehicle 16 through a ride cycle of the amusement attraction 10. The steps illustrated in the process 120 are meant to facilitate discussion and are not intended to limit the scope of this disclosure, because additional steps may be performed, certain steps may be omitted, and the illustrated steps may be performed in an alternative order or in parallel, where appropriate. The process 120 may be representative of initiated code or instructions stored in a non-transitory computer-readable medium (e.g., the memory 102) and executed, for example, by the processor 100 of the vehicle controller 14 of the resistance control system 12. The processor 100 may be communicatively coupled via a network, such as a wireless network, to receive and send the instructions and signals described below.

In the presently illustrated embodiment, the vehicle controller 14 performing the process 120 starts (block 122) a ride cycle by receiving (block 124) an input. For example, the vehicle controller 14 may receive signals from the weight sensor 94 after the rider 22 has boarded the ride vehicle 16. In some embodiments, the weight sensor 94 may transmit signals continuously, such that the vehicle controller 14 identifies one of the signals as being indicative of the weight of the rider 22 in response to the signals being constant (e.g., within 1%, within 5%) for a threshold time period. Such embodiments may facilitate security within the amusement attraction 10 by providing a baseline weight value of the rider 22 to the vehicle controller 14. The vehicle controller 14 may therefore present an alert to an operator of the amusement attraction 10 and/or shut down the ride vehicle 16 in response to a detected weight value that is outside a predetermined threshold from the baseline weight value (e.g., indicative of a dropped item, a premature departure). In additional or alternative embodiments, the vehicle controller 14 may receive an image or other identifier, such as from the visual sensor 96. The identifier may indicate a resistance setting, such as a requested resistance setting, of the rider 22. In other embodiments, the vehicle controller 14 may receive a user input from the input device 98. The user input may indicate the weight of the rider 22 or a requested resistance setting entered into the user interface. In some embodiments, the vehicle controller 14 converts the user input into a value, such as a weight value. As such, it should be understood that the vehicle controller 14 may perform the following steps of the process 120 with respect to any suitable received information, which may, for example, include raw output of the weight sensor 94 in volts.

Continuing the process 120, the vehicle controller 14 queries (block 126) the resistance setting database 104 to retrieve a target actuator length that corresponds to the input. As mentioned, the resistance setting database 104 includes entries that associate respective lengths of the actuators 74 with various data or parameters, such as rider weights. The vehicle controller 14 thus utilizes the input to identify a suitable actuator length for the actuators 74 that provides an appropriate resistance to movement for the rider 22 based on a particular parameter. In general, the target actuator length is more extended (e.g., corresponding to a smaller separation distance 76) for heaver rider weights than lighter rider weights to increase the movement resistance of the ride vehicle 16 for the heavier rider weights. With the appropriate target actuator length identified, the vehicle controller 14 controls, operates, or instructs (block 130) the actuators 74 to extend or contract to reach the target actuator length, thus disposing the actuator plate 70 at a specified separation distance 76 from the spring plate 32. In other embodiments, the resistance setting database 104 may include entries that associate respective positions of the actuator plate 70 with various rider parameters, and the resistance control system 12 may control the weight resistance of the ride vehicle 16 by moving the actuator plate 70 to a target actuator plate position corresponding to a particular rider parameter, which corresponds to a target separation distance 76 from the spring plate 32.

With the tension of the ride vehicle 16 calibrated to the input, the vehicle controller 14 provides (block 132) a ride experience to the rider 22 through the ride vehicle 16 that corresponds to the virtual experience provided through the VR device 24. For example, the VR controller 26 of the VR device 24 may instruct the processor 62 to generate particular virtual images to display to the rider 22. The rider 22 generally moves his or her bodyweight relative to the ride vehicle 16 to provide user input to the vehicle controller 14 (e.g., via the inclinometer 92), which communicates the user input to the VR controller 26. The VR controller 26 therefore adjusts the virtual images displayed to the rider 22 to display a target set of virtual images that corresponds to the received user input. For example, in response to the rider 22 leaning to the left, the spring plate 32 may move in pitch 52 by a particular amount (e.g., inches) based on the resistance of the ride vehicle 16. The inclinometer 92 senses the movement of the spring plate 32 and transmits a signal indicative of the movement to the vehicle controller 14. The vehicle controller 14 may therefore instruct the VR controller 26 to adjust the virtual images provided through the VR device 24 to display a corresponding virtual movement in pitch 52. It should be understood that, in other embodiments, the VR controller 26 is embedded or stored within the vehicle controller 14. It should be understood that in other embodiments, the amusement attraction 10 may include features other than or in addition to the VR device 24, such as a projection screen, which receives the user input as feedback that enhances rider enjoyment. In further embodiments, such as those in which the ride vehicle 16 moves along a track, the VR device 24 and the VR controller 26 are omitted.

In addition to commanding the VR device 24 to respond to the movements of the ride vehicle 16, the resistance control system 12 enables the ride vehicle 16 to respond to instructions from the VR controller 26. For example, the vehicle controller 14 performing the process 120 determines (block 134) whether a haptic feedback request is received from the VR controller 26. Continuing the above example, in response to the rider 22 steering the ride vehicle 16 such that a virtual representation of the ride vehicle 16 contacts a boundary (e.g., a fence, a cloud, an obstacle), the VR controller 26 may request that the vehicle controller 14 vibrate or otherwise manipulate the ride vehicle 16 to indicate the contact. It should be understood that the vehicle controller 14 may receive any single or multiple haptic feedback requests from the VR controller 26, including continuous requests and/or preprogrammed requests.

In response to receiving the haptic feedback request, the vehicle controller 14 instructs (block 136) the actuators 74 to manipulate the actuator plate 70 to correspond to the VR experience of the VR device 24. In certain embodiments, the actuators 74 may extend to position the actuator plate 70 in contact with the springs 34 of the spring plate 32 and/or move the spring plate 32, thereby providing haptic feedback to the rider 22. The vehicle controller 14 may instruct the actuators 74 to adjust in length either individually or in sync with one another. For example, the actuators 74 may be instructed to further tension one region (e.g., quadrant, side) of the ride vehicle 16 to discourage the rider 22 from steering the ride vehicle 16 in a direction that corresponds to the one region. In other embodiments, the actuators 74 may be instructed to move the entirety of the actuator plate 70 sequentially up and down, or in a random manner, to provide an experience of floating to the rider 22. After fulfilling the haptic feedback request, the vehicle controller 14 may return to instruct (block 130) the actuators 74 to move to the target actuator length.

Alternatively, in response to determining that a haptic feedback request is not unfulfilled or outstanding, the vehicle controller 14 may determine (block 140) whether the present ride cycle of the amusement attraction 10 is completed. The vehicle controller 14 may consult a clock, the VR controller 26, or any other suitable component to perform the determination of block 140. In response to determining that the ride cycle is not completed, the vehicle controller 14 performing the illustrated embodiment of the process 120 returns to block 134 to continue determining whether haptic feedback requests are received. Alternatively, in response to determining that the ride cycle is completed, the vehicle controller 14 instructs (block 142) the actuators 74 to return to a default length, thereby ending (block 144) the process 120. The default length may correspond to a relaxed state of the actuators 74, a most common length that suits a majority of riders 22, a length that facilitates dismounting from the ride vehicle 16 (e.g., tilting the spring plate 32 toward an exit of the amusement attraction 10), and so forth. The resistance control system 12 having the vehicle controller 14 therefore efficiently improves rider experience within the amusement attraction 10 by semi-passively tuning the weight resistance of the ride vehicle 16 to each particular rider parameter. Moreover, the resistance control system 12 disclosed herein provides dynamic haptic feedback to the rider 22 that corresponds to the virtual images provided through the VR device 24, further generating dynamic and enjoyable rider experiences.

In certain embodiments, the VR controller 26 may be configured to operate multiple VR devices 24 of respective riders 22 in a manner that enables the riders 22 to virtually interact with one another within the same virtual environment. For example, the VR controller 26 may cause the VR devices 24 to present a virtual experience in which the riders 22 may compete against one another in a race. For this reason, the VR controller 26 may also cause the VR devices 24 to present virtual images of another rider 22, output haptic feedback based on an interaction with another rider 22, or otherwise operate the VR devices 24 based on another rider 22. By way of example, multiple ride vehicles 16 may be located within the same enclosure or room of the amusement attraction 10 so that the amusement attraction 10 can accommodate multiple riders 22 simultaneously, such as riders 22 participating in the same virtual environment presented by respective VR devices 24. In additional or alternative embodiments, the amusement attraction 10 can accommodate multiple riders 22 who are participating in different virtual environments and experiences. That is, the amusement attraction 10 may accommodate multiple riders 22, but at least a portion of the riders 22 may be in separate virtual experiences and are not virtually interacting with one another. In any case, such arrangement may increase an efficiency of providing riders 22 with virtual experiences as compared to an amusement attraction 10 having a single ride vehicle 16.

Figure 3:
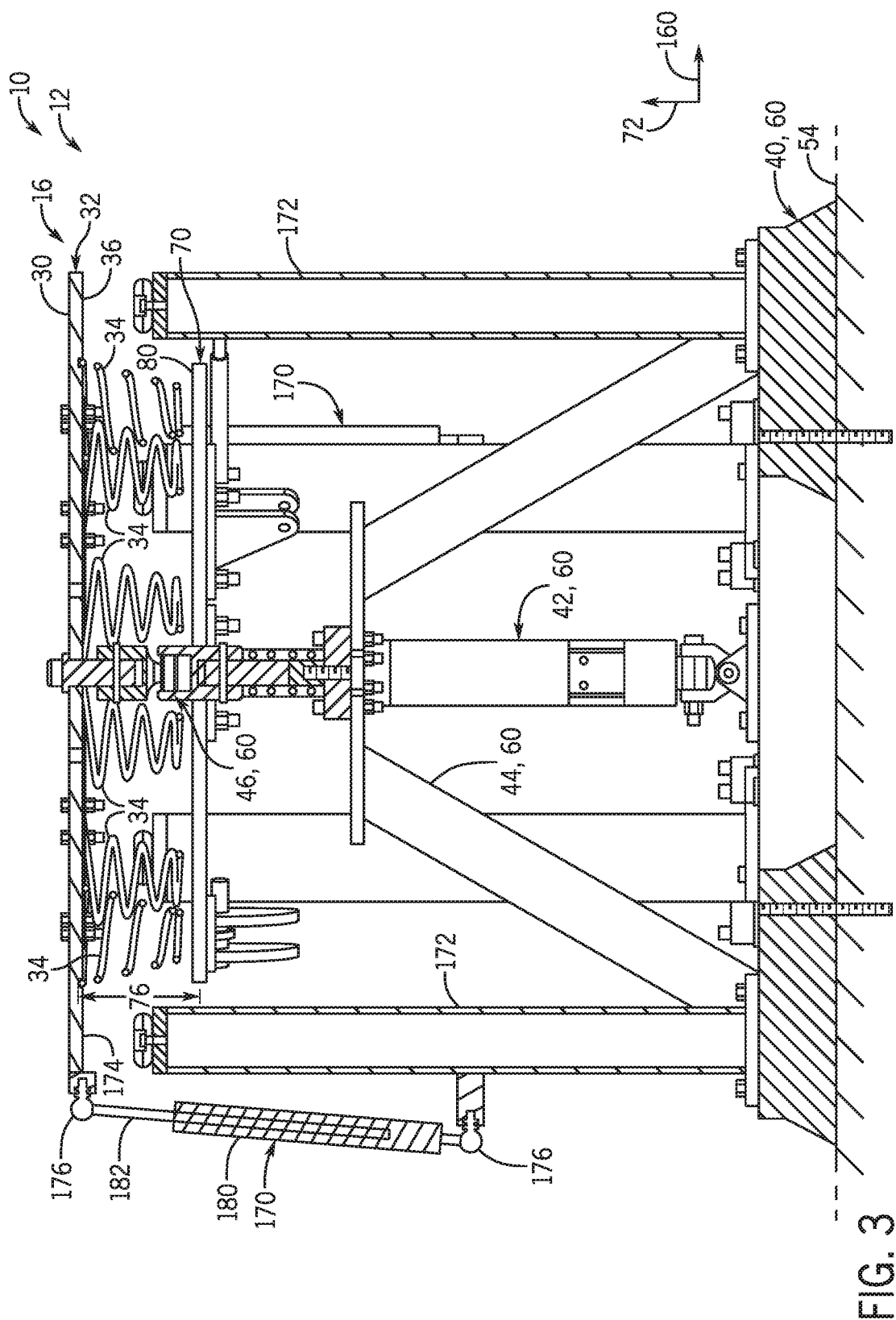
FIG. 3 is a cross-sectional elevational view of an embodiment of the stationary ride vehicle of FIG. 1, in accordance with embodiments of the present disclosure.

With the above understanding of operation of the resistance control system 12 in mind, further discussion is provided herein regarding example embodiments of the ride vehicle 16 controlled by the resistance control system 12. For example, FIG. 3 is a cross-sectional elevational view of an embodiment of the ride vehicle 16 having the spring plate 32 in a horizontal orientation (e.g., aligned with a horizontal axis 160). As discussed above, the ride vehicle 16 includes the actuator plate 70, the spring plate 32, and the support assembly 60 having the base plate, the support beam 42, and the pivot joint 46. Because the ride vehicle 16 is stationary, the base 40 is disposed in contact with the ground surface 54. In other embodiments, the resistance control system 12 may be utilized on a mobile motion base and the ground surface 54 may be representative of a larger vehicle to which the ride vehicle 16 is coupled.

The ride vehicle 16 also includes six springs 34, which are illustrated as conical mechanical springs in the present embodiment. The conical mechanical springs generally have length-variable or non-linear spring constants, such that initial compression of the springs against the actuator plate 70 progresses with less force than further compression of the springs 34. In the present embodiment, the springs 34 are evenly spaced from each other in a hexagonal or circular formation, which is centered over the pivot joint 46. However, it should be understood that any other suitable type, formation, and quantity of springs 34 may be employed within the ride vehicle 16 to selectively compress against and/or contact the actuator plate 70. For example, the conical springs may be replaced with cylindrical, helical springs having progressive spring constants coupled to one another in series (e.g., compound springs), in some embodiments. The ride vehicle 16 may alternatively include a single spring 34 that is suitably positioned within the ride vehicle 16 to enable the presently disclosed features to dynamically adjust the weight resistance of the ride vehicle 16.

The resistance control system 12 also includes moderating features that further improve rider experience on the ride vehicle 16. For example, the ride vehicle 16 of the present embodiment includes speed limiters 170 (e.g., gas springs) that control movement of the spring plate 32. The speed limiters 170 are each coupled between the spring plate 32 and a peripheral support beam 172 that is positioned beneath an outer edge 174 of the spring plate 32. In the illustrated embodiment, the speed limiters 170 include spherical rolling bearings 176 that give three-axis rotational freedom, though any other suitable connection components with the same or more restricted rotational movement may be employed. The speed limiters 170 include a piston 180 and a rod 182 that moves relative to the piston 180 to provide damping to the motion of the ride vehicle 16. It should be noted that, in some embodiments, this dampened motion correlates to movement of a seat within or part of a ride vehicle, a ride vehicle that is effectively a seat, or both a ride vehicle and a seat of the ride vehicle.

Figure 4:
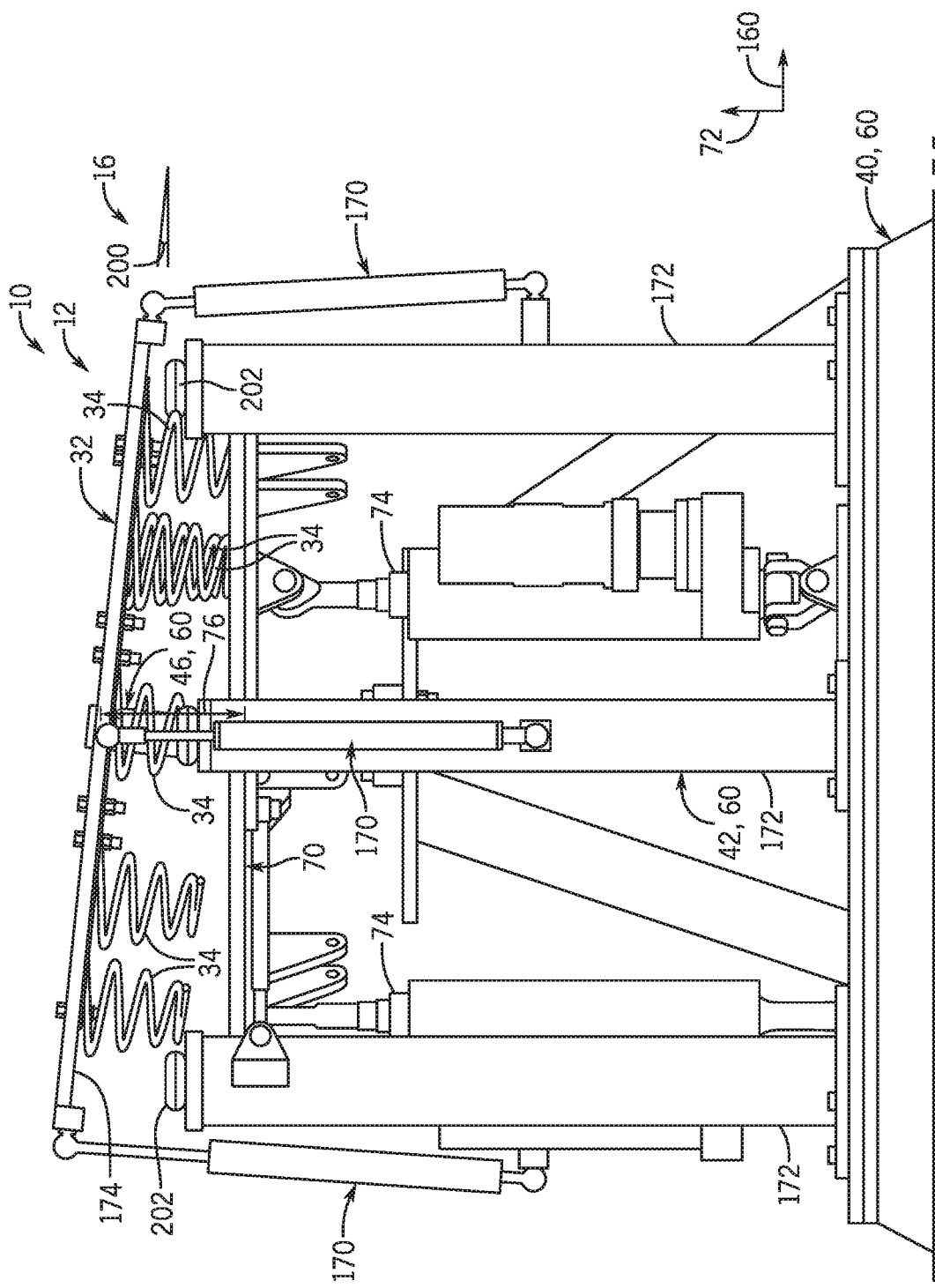
FIG. 4 is a side perspective view of an embodiment of the stationary ride vehicle of FIG. 3 in a tilted orientation, in accordance with embodiments of the present disclosure.

FIG. 4 is a side perspective view of an embodiment of the stationary ride vehicle 16 having the spring plate 32 in a tilted orientation. As illustrated, the spring plate 32 is disposed at an inclination angle 200 relative to the actuator plate 70, due to weight shifting of the rider 22 that may be boarded onto the spring plate 32. The ride vehicle 16 also includes bumpers 202 (e.g., rubber bumpers, stoppers) positioned on the peripheral support beams 172 disposed underneath the spring plate 32. The bumpers 202 generally enable the spring plate 32 to freely rotate up to a threshold inclination angle at which the bottom surface 36 of the spring plate 32 contacts the bumpers 202, and the bumper 202 may block further rotation of the spring plate 32, such as to avoid an unstable orientation of the spring plate 32 relative to the actuator plate 70. By way of example, the bumper 202 may enable the spring plate 32 to rotate to various positions forming an inclination angle 200 within 10 degrees relative to the actuator plate 70. As such, the bumpers 202 may confine movement of the spring plate 32 within a physical movement range or envelope. The bumpers 202 may also include a contact sensor that provides signals to the vehicle controller 14 to indicate whether the spring plate 32 is contacting the respective bumper 202. For instance, in response to determining the spring plate 32 is contacting one of the bumpers 202, the vehicle controller 14 may provide haptic feedback to urge the rider 22 to shift his or her weight such that the spring plate 32 no longer contacts the bumper 202. In some embodiments, six bumpers 202 and six peripheral support beams 172 may be included in the ride vehicle 16. In such cases, every other peripheral support beam 172 may also be indirectly coupled to the spring plate 32 via one of the speed limiters 170 discussed above.

The actuators 74 illustrated in the present embodiment are coupled between the actuator plate 70 and the base 40. Thus, the actuators 74 may move the actuator plate 70 along the vertical axis 72 to adjust the effective spring constant of the springs 34, such as by increasing or decreasing the separation distance 76 between the actuator plate 70 and the spring plate 32 (e.g., in a horizontal position corresponding to the pivot joint 46 or a fulcrum of the spring plate 32). The ride vehicle 16 may include three actuators 74 that are spaced equidistant from one another in a triangular formation, though it should be understood that additional actuators 74 may be included and evenly spaced relative to one another in any suitable polygonal shape. Moreover, the speed limiters 170 discussed above may be positioned in a triangle formation that is a mirror image of the triangle formation of the actuators 74, thereby evenly distributing force of the speed limiters 170 and the actuators 74 around a perimeter of the ride vehicle 16. In other embodiments, such as those in which the ride vehicle 16 is mobile, the force of the speed limits 170 and the actuators 74 may be evenly distributed around a seat of the ride vehicle 16.

Figure 5:
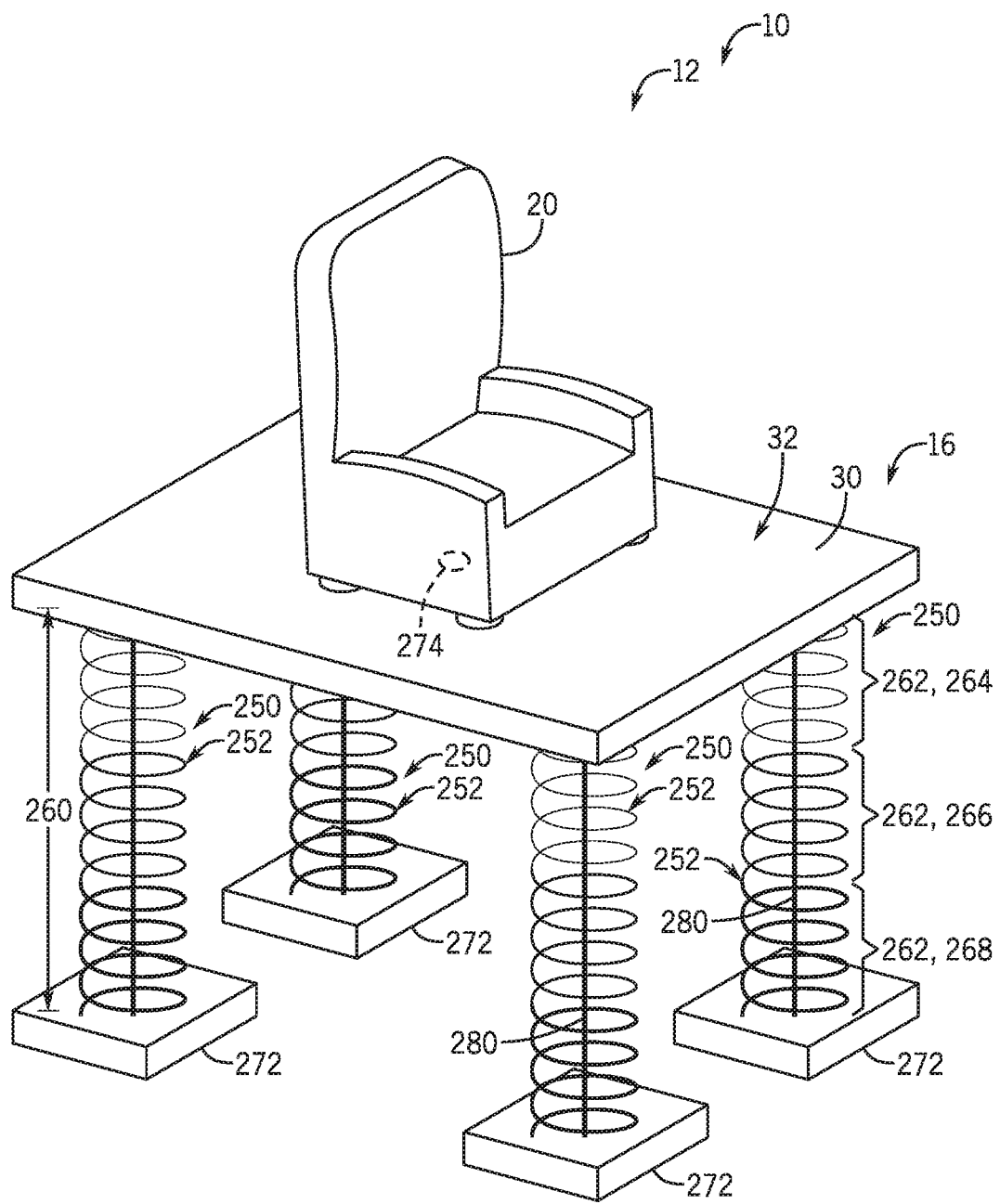
FIG. 5 is a schematic perspective view of another embodiment of a stationary ride vehicle having compound springs, in accordance with embodiments of the present disclosure.

FIG. 5 is a perspective diagram illustrating another embodiment of the resistance control system 12 that controls the ride vehicle 16 within the amusement attraction 10. The ride vehicle 16 includes the spring plate 32 and the seat 20 or other rider accommodation coupled to the top surface 30 of the spring plate 32. From the seat 20, the rider 22 may steer the ride vehicle 16 with his or her bodyweight. Notably, the ride vehicle 16 includes spring columns 250 coupled to the bottom surface 36 of the spring plate 32 to selectively adjust a resistance of the ride vehicle 16 based on a parameter associated with the rider 22. Each spring column 250 includes a height-adjustable spring assembly 252 that is passively (e.g., naturally) compressed to a target height 260 by the weight of the rider 22.

In the present embodiment, each height-adjustable spring assembly 252 includes three spring regions 262, namely: a high-compression region 264, a medium-compression region 266, and a low-compression region 268. As used herein, each spring region 262 is defined as any suitable component that provides a respective spring constant. As such, the low-compression region 268 has a larger spring constant than the medium-compression region 266 or the high-compression region 264, indicating that more force is utilized to compress the low-compression region 268 (e.g., as approximated by Hooke's law). In the present embodiment, the compressibility of each spring region 262 is provided by selecting a target wire thickness for the spring region 262, though any other suitable properties of the spring regions 262 may be varied (e.g., material, coating, treatment, size).

For example, the high-compression region 264 may be designed to be active for riders having a first weight range (e.g., 0 to 50 pounds), beyond which the high-compression region 264 is fully compressed and substantially stiff. The other spring regions 266, 268 may be negligibly compressed and act substantially stiff for riders having a weight within the first weight range. The medium-compression region 266 may be designed to be active for a second weight range (e.g., 51 to 150 pounds) that is higher than the first weight range. As such, the medium-compression region 266 is actively compressible for riders having a weight within the second weight range, while the high-compression region 264 is fully compressed and the low-compression region 268 is substantially stiff. Similarly, the low-compression region 268 may be designed to be active when supporting riders having a weight within a third weight range (e.g., 151 to 300 pounds), such that the other spring regions 264, 266 are fully compressed. Accordingly, after the rider 22 boards the ride vehicle 16, the height-adjustable spring assemblies 252 of the ride vehicle 16 passively compress to tune the weight resistance of the ride vehicle 16 to the weight of the rider 22. In additional or alternative embodiments, the compression of the spring assemblies 252 may be based on other parameters associated with the riders, including a requested resistance setting, a previous experience, and the like (e.g., via a semi-passive control system that adjusts the weight resistance based on a received or determined input).

The spring regions 262 presently include cylindrical, helical coil springs that are coupled in series with one another between the spring plate 32 and a respective base plate 272. In other embodiments, each spring column 250 may include a single conical spring that provides continuously variable spring regions along the height of the spring columns 250, or other suitable resistance-variable components discussed above (e.g., gas springs, magnetic repulsion assemblies). Although illustrated with four spring columns 250 each having three spring regions 262, it should be understood that any suitable number of spring columns 250 with any suitable number of spring regions 262 may be implemented within the ride vehicle 16, including a single spring column 250 positioned underneath a center point 274 of the spring plate 32. In accordance with the present disclosure, reference to a spring element may include any feature capable of providing resistive spring force, such as a metal spring, plastic spring, leaf spring, conical or cylindrical coil, gas spring, magnetic repulsion assembly, or the like.

In the illustrated embodiment, each spring column 250 includes a linkage mechanism 280 (e.g., cable, rope, chain) coupled between the respective base plate 272 and the spring plate 32 to restrict lateral motion of the spring columns 250. The linkage mechanism 280 is illustrated as disposed within the height-adjustable spring assembly 252, though it should be understood that the linkage mechanism 280 may be positioned elsewhere within the spring column 250. In certain embodiments, the linkage mechanism 280 facilitates securement of the spring columns 250 to the target height 260, as discussed in more detail below. In other embodiments, the ride vehicle 16 may operate without securing the spring columns 250, thereby enabling less complex construction and operation of the amusement attraction 10.

Figure 6:
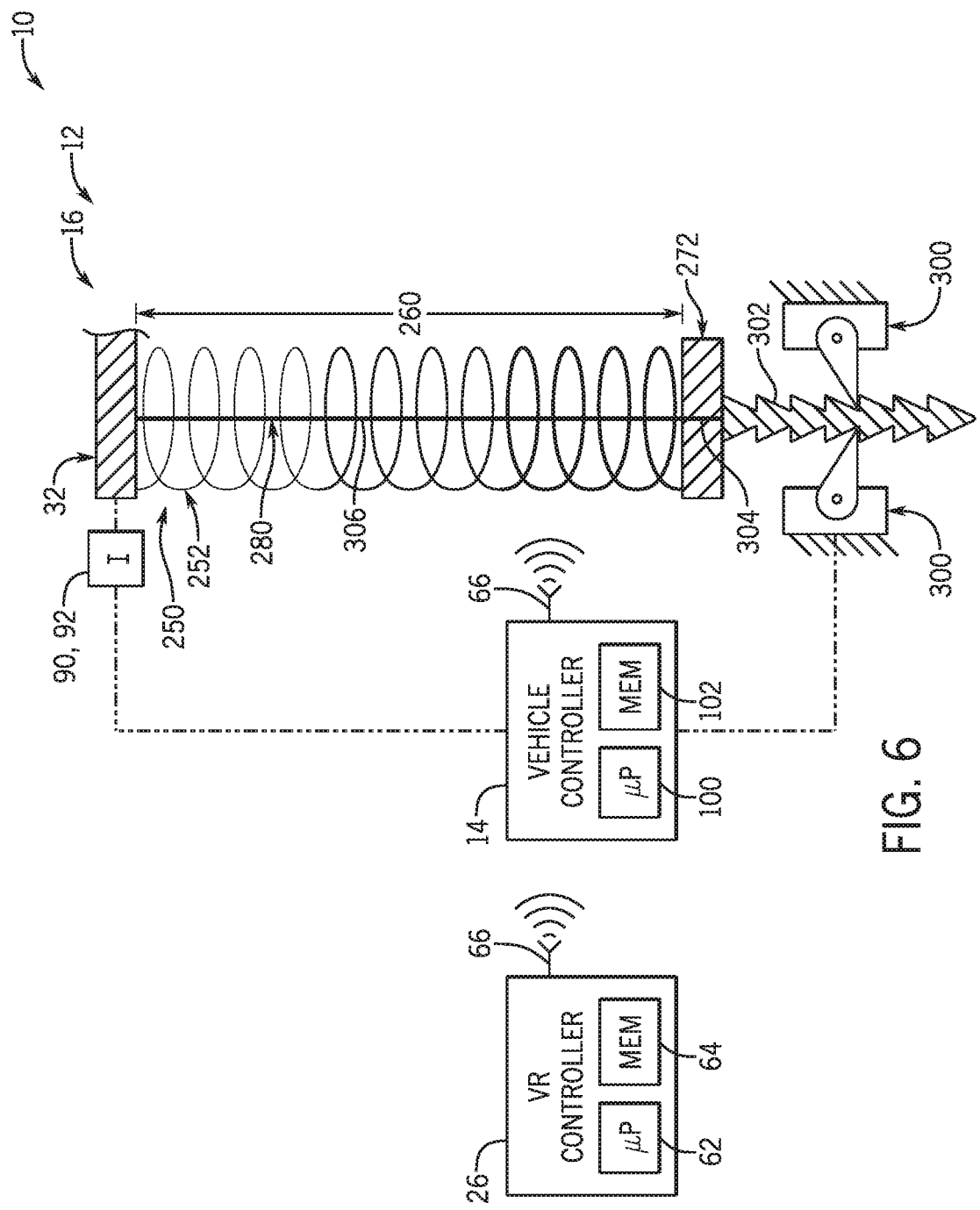
FIG. 6 is a schematic diagram of an embodiment of a compound spring column of the stationary ride vehicle of FIG. 5, in accordance with embodiments of the present disclosure.

FIG. 6 is a schematic diagram of an embodiment of the resistance control system 12, which includes the vehicle controller 14 and the VR controller 26 discussed above. The present discussion focuses on operation of a single spring column 250 of the ride vehicle 16, though it should be understood that each spring column 250 may operate similarly. The illustrated embodiment of the spring column 250 includes locking devices 300 that selectively secure the spring columns 250 at the target height 260 based on a weight of the rider 22. For example, the locking devices 300 may be ratcheting devices that receive a ribbed extension 302 coupled to a distal end 304 of a main body 306 of the linkage mechanism 280. In such embodiments, the base plate 272 may include an opening that enables the main body 306 of the linkage mechanism 280 to be coupled to, and disposed on an opposite side of the base plate 272 from, the ribbed extension 302. In such embodiments, the weight of the rider 22 may passively compress the height-adjustable spring assembly 252 to a target height 260, moving the spring plate 32 closer to the base plate 272 and depressing the ribbed extension 302 to a target position relative to the locking devices 300. It should be understood that any other suitable locking devices may be implemented within the ride vehicle 16, such as a reel and spool that secure the linkage mechanism 280, caliper brakes, locking gas springs, magnetic retention systems, locking racks and/or pinions, and so forth.

In embodiments having the locking devices 300, the vehicle controller 14 is communicatively coupled to the locking devices 300 to control operation of the locking devices 300. For example, the ratcheting embodiments of the locking devices 300 may passively retain the spring columns 250 to have the target height 260 in response to force applied by the weight of the rider. In other embodiments having active locking devices 300, the vehicle controller 14 may instruct the locking devices 300 to secure the spring columns 250 in response to determining that a ride cycle of the amusement attraction 10 is initiated. In either case, the vehicle controller 14 may instruct the locking devices 300 to release the ribbed extension 302 or other suitable components of the spring column 250 to enable the spring column 250 to return to a default height (e.g., uncompressed height) in response to determining that the ride cycle is completed.

The illustrated embodiment of the resistance control system 12 also includes the inclinometer 92 coupled to the spring plate to provide feedback to the VR controller 26, thereby enabling the VR controller 26 to align the virtual experience of the VR device 24 to a current position of the ride vehicle 16. As discussed above, any other suitable sensors 90 may be additionally or alternatively coupled to the ride vehicle 16 to facilitate operation of the amusement attraction 10. Notably, the resistance control systems 12 of FIGS. 5 and 6 do not include the weight sensor 94, providing a less complex embodiment of the ride vehicle 16, while enabling semi-passive control of the weight resistance of the ride vehicle 16 for improved rider experiences.

Figure 7:
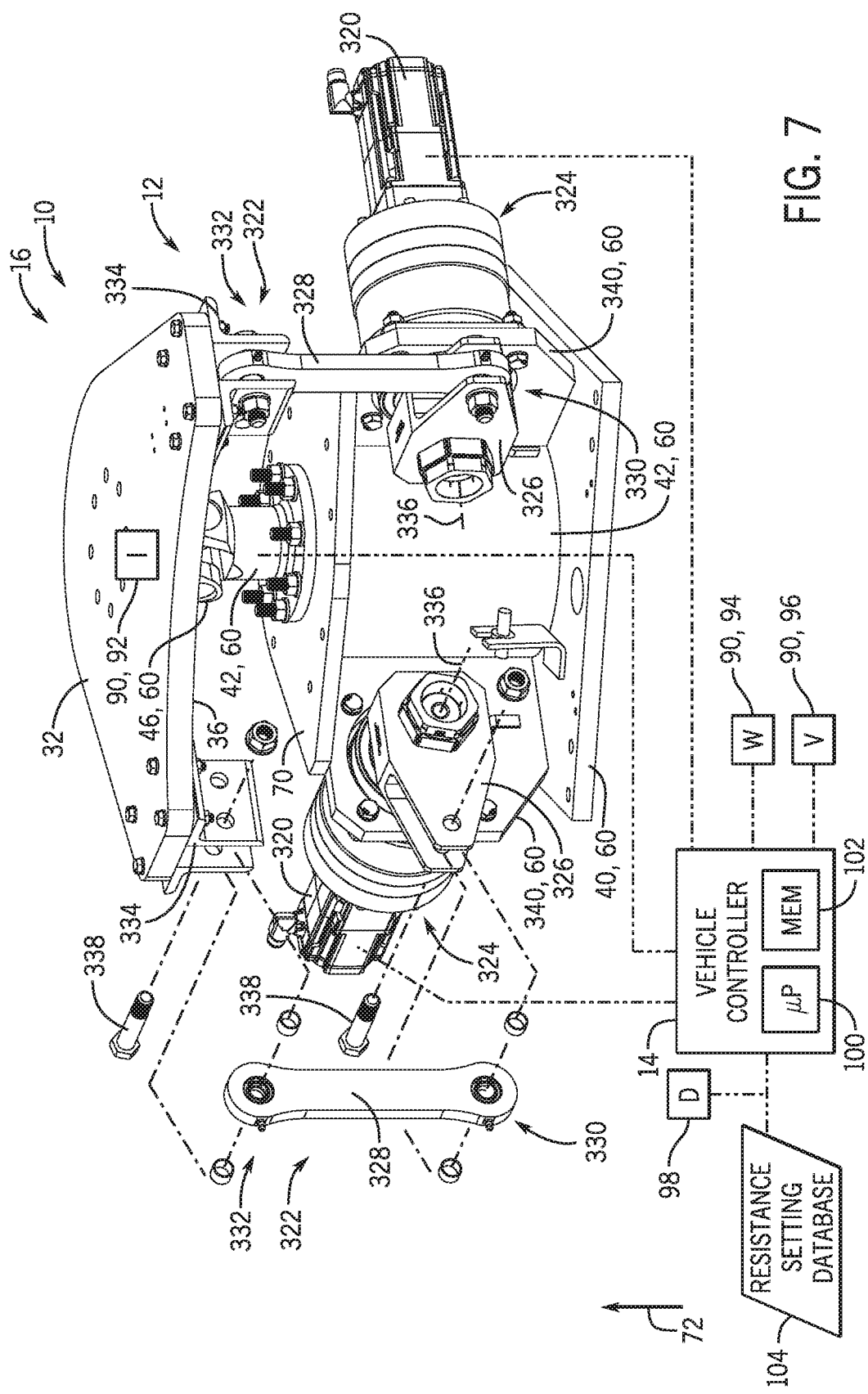
FIG. 7 is a perspective view of another embodiment of the stationary ride vehicle of FIG. 1 having motors, in accordance with embodiments of the present disclosure.

FIG. 7 is a perspective view of an embodiment of the ride vehicle 16 using the resistance control system 12 for controlling movement of a passenger support (e.g., the seat 20, a ride vehicle cabin). The resistance control system 12 includes motors 320 and linkage systems 322 to enable the motor 320 to drive movement of the spring plate 32 about the pivot joint 46 of the support beam 42 extending between the spring plate 32 and the actuator plate 70. Thus, the motor 320 may drive movement of the spring plate 32 relative to the actuator plate 70. Although the illustrated ride vehicle 16 includes the spring plate 32 and the actuator plate 70, it should be noted that the spring plate 32 and actuator plate 70 are representative of any suitable foundation, support, or brace. That is, the spring plate 32 and/or the actuator plate 70 may have any suitable shape (e.g., a dome, a sphere, a cube) to provide movement of the ride vehicle 16.

Each motor 320 (e.g., an electromechanical motor, a pneumatic motor, a hydraulic motor) may operate to adjust resistance to movement of the spring plate 32 about the pivot joint 46. In the illustrated embodiment, each motor 320 is coupled to a respective gearbox 324 of the linkage system 322, and each gearbox 324 is coupled to a first bracket 326 of the linkage system 322. Thus, a torque output by the motor 320, such as to cause rotation of a shaft of the motor 320, may drive rotation of gears of the gearbox 324 to cause rotation of the first bracket 326. As an example, each motor 320 may utilize a keyless bushing to rotate the shaft and the gearbox 324 to enable smooth movement of the spring plate 32. Each first bracket 326 is coupled to a linkage 328 of the linkage system 322 at a first end 330 of the linkage 328. Further, a second end 332 of each linkage 328 may be coupled to a respective second bracket 334 of the linkage system 322, and each second bracket 334 be coupled to a section (e.g., a corner, a side) of the bottom surface 36 of the spring plate 32.

Each motor 320 may be configured to output a torque that may control and/or drive rotational movement of the first bracket 326 about a respective horizontal axis 336 or a respective axis parallel to the horizontal axes 336. Such rotational movement of the first brackets 326 may cause corresponding movement of the linkages 328 generally along an axis parallel to the vertical axis 72 to impart a force onto a respective section of the spring plate 32. The imparted force may move (e.g., pitch, roll) the spring plate 32 relative to the actuator plate 70. To this end, each linkage 328 may be rotatably coupled to a corresponding first bracket 326 and second bracket 334, such as via a rotatable fastener 338 (e.g., a shoulder screw) of the linkage system 322 to enable rotational movement between the linkages 328 and the brackets 326, 334 about the respective horizontal axes 336. The rotation between the linkages 328 and the brackets 326, 334 may enable greater control of movement of the spring plate 32 relative to the actuator plate 70. Moreover, the coupling between the linkages 328 and the brackets 326, 334 may enable additional movement between the linkages 328 relative to the brackets 326, 334 to facilitate movement of the spring plate 32 relative to the actuator plate 70. As an example, the linkages 328 may linearly translate along the rotatable fasteners 338 and/or may rotate relative to the brackets 326, 334 about another axis (e.g., via additional fasteners of the linkage systems 322).

In the illustrated embodiment, the linkage system 322 is supported via plates 340 that extend between the base 40 and the actuator plate 70 (e.g., coupled to the support beam 42). For instance, the plates 340, which may be a part of the support assembly 60, may be fixedly coupled to the actuator plate 70, the base 40, and/or the support beam 42, and the gearbox 324 may be fixedly coupled to the plates 340 to block movement between the gearbox 324 and the support assembly 60, thereby stabilizing the linkage system 322. In this manner, the plates 340 may facilitate provision, by the motors 320, of desirable movement of the spring plate 32 relative to the actuator plate 70.

In some embodiments, each motor 320 may be back-drivable. That is, sufficient force (e.g., caused by the rider 22 shifting his or her bodyweight) imparted onto the spring plate 32 may cause movement of the spring plate 32 relative to the actuator plate 70 opposite the movement of the spring plate 32 caused by the torque output by the motors 320. In other words, sufficient force may be used to cause rotation of any of the first brackets 326 in a direction opposite a direction of rotation caused by the torque output by the motors 320. In this manner, the amount of torque output by the motors 320 to impart a force onto the spring plate 32 may adjust the amount of a counter force necessary to move the spring plate 32 relative to the actuator plate 70 against the torque output by the motors 320. Thus, the torque output by the motors 320 set a resistance of movement of the spring plate 32. In particular, increasing the torque output may increase the resistance of movement, and reducing the torque output may reduce the resistance of movement.

Each motor 320 may be communicatively coupled to the vehicle controller 14, and the vehicle controller 14 may instruct the motors 320 to output a torque accordingly. Indeed, the vehicle controller 14 may receive an input, such as from the inclinometer 92, the weight sensor 94, the visual sensor 96, the input device 98, another suitable source, or any combination thereof, and the vehicle controller 14 may operate the motors 320 to provide a resistance of movement of the spring plate 32 based on the input. In the illustrated embodiment, the weight sensor 94 is positioned underneath the base 40 (e.g., coupled to an underside of the base 40) to enable the weight sensor 94 to monitor a weight of the spring plate 32, the support assembly 60, the actuator plate 70, the motors 320, the linkage systems 322, the rider 22, and so forth (e.g., an entirety of the ride vehicle 16). In additional or alternative embodiments, the weight sensor 94 may be positioned (e.g., between the actuator plate 70 and the spring plate 32) to monitor a portion of the ride vehicle 16 and/or of the rider 22. In any case, any of the techniques described above regarding setting the resistance of movement of the spring plate 32 may be incorporated in order to set the torque output by the motors 320, such as based on a weight of the rider 22, a preference of the rider 22, an identifier of the rider 22, and so forth. As an example, the vehicle controller 14 may operate in a semi-passive mode to impart a resistance of movement between the spring plate 32 and the actuator plate 70 via torque output of the motors 320, and the vehicle controller 14 may refer to the resistance setting database 104 to determine the particular torque to be output by the motors 320, such as based on an algorithm or a database table (e.g., a look up table) stored in the resistance setting database 104 and associating the torque output to another parameter.

The vehicle controller 14 may also operate in an active mode that causes each motor 320 to output a torque that overcomes the force imparted by the rider 22 onto the spring plate 32. Indeed, in the active mode, the vehicle controller 14 may operate the motors 320 to drive the spring plate 32 to move in a desirable manner (e.g., to a target position or orientation) relative to the actuator plate 70, instead of enabling the rider 22 to drive movement of the spring plate 32 (e.g., in the semi-passive mode of the vehicle controller 14). For instance, the vehicle controller 14 may operate in the active mode to move the spring plate 32 and impart a certain sensation and ride experience to the rider 22. To this end, the vehicle controller 14 may receive sensor data, such as the orientation of the spring plate 32 determined via the inclinometer 92 and/or the weight of the rider 22 determined via the weight sensor 94, to determine the appropriate torque to be output by the motors 320 to cause the desirable movement of the spring plate 32 relative to the actuator plate 70.

Indeed, the vehicle controller 14 may adjust the torque output by the motors 320 at different times of a single ride cycle. By way of example, at a first time of the ride cycle, the vehicle controller 14 may operate in a first semi-passive mode that instructs the motors 320 to output a respective torque to cause a first resistance of movement between the spring plate 32 and the actuator plate 70 that enables the rider 22 to move the spring plate 32. At a second time of the ride cycle, the vehicle controller 14 may operate in a second semi-passive mode that instructs the motors 320 to increase the torque output to cause a second, increased resistance of movement between the spring plate 32 and the actuator plate 70 that enables the rider 22 to move the spring plate 32 with more difficulty. At a third time of the ride cycle, the vehicle controller 14 may operate in an active mode that instruct the motors 320 to further increase the torque output to drive movement of the spring plate 32 and the actuator plate 70 and to block the rider 22 from moving the spring plate 32 relative to the actuator plate 70. Accordingly, the vehicle controller 14 may operate in different modes to create a different experience for the rider 22 at different times of the ride cycle. For instance, the vehicle controller 14 may operate in the different modes based on a predetermined setting (e.g., a time of a ride cycle), in response to sensor data, based on a preference of the rider 22, and so forth.

Further still, the vehicle controller 14 may adjust the torque output by the motors 320 based on the positioning of the spring plate 32 relative to the actuator plate 70. By way of example, in response to determining an increase of the inclination angle 200 between the spring plate 32 and the actuator plate 70 (e.g., based on sensor data received from the inclinometer 92), the vehicle controller 14 may instruct one of the motors 320 to increase the torque output to block the inclination angle 200 from further increasing. In this way, the vehicle controller 14 may adjust the torque output by the motors 320 to adjust the resistance of movement of the spring plate 32 to maintain an inclination angle 200 between the spring plate 32 and the actuator plate 70 below a threshold value.

Figure 8:
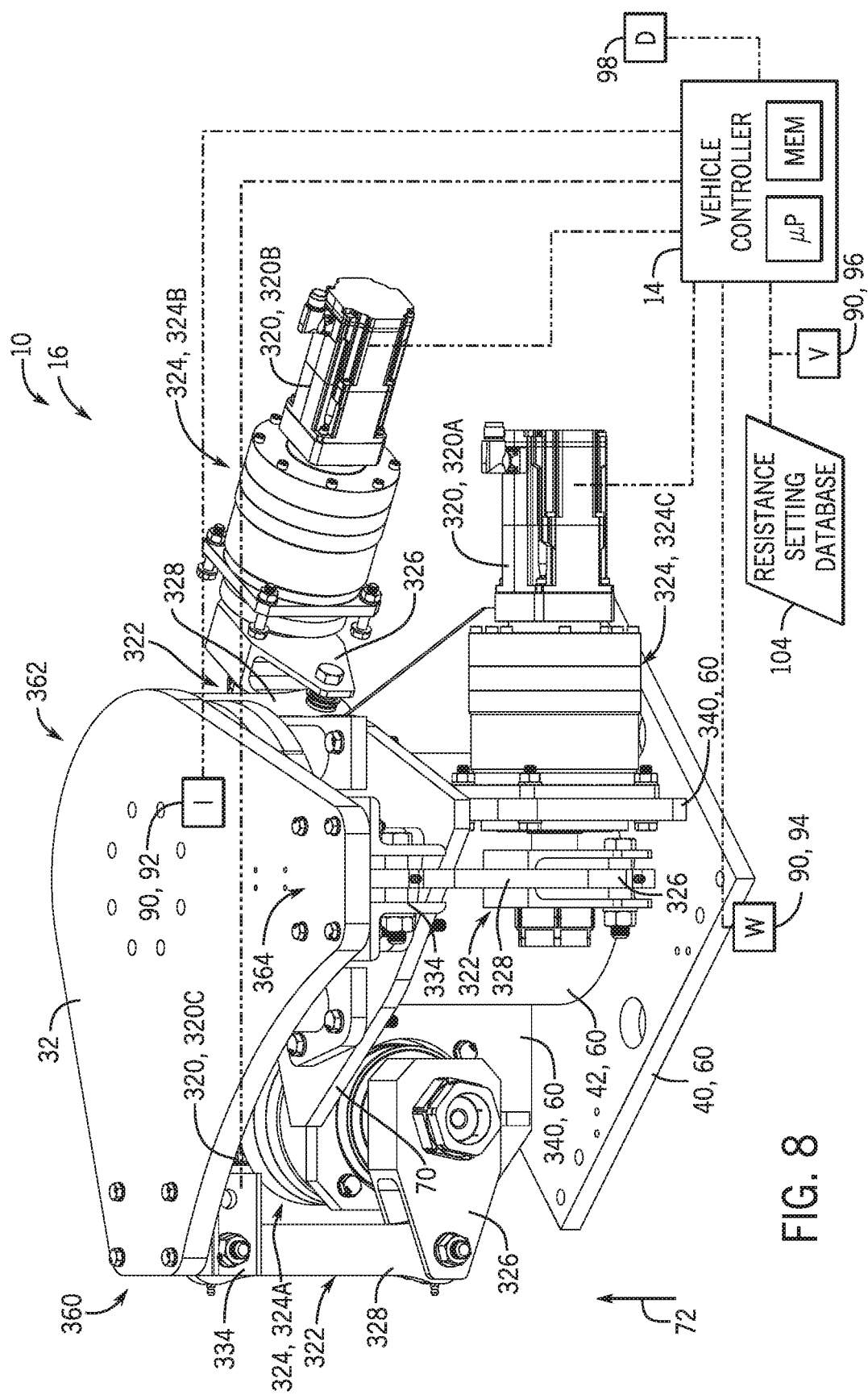
FIG. 8 is a perspective view of another embodiment of the stationary ride vehicle of FIG. 1 having motors, in accordance with embodiments of the present disclosure.

FIG. 8 is a perspective view of an embodiment of the ride vehicle 16 using a resistance control system 12 that includes three motors 320 and three corresponding linkage systems 322. The vehicle controller 14 may be communicatively coupled to each of the motors 320 in order to move the spring plate 32. By way of example, the illustrated spring plate 32 has a triangular shape in which a first motor 320A is configured to move a first linkage system 324A coupled to a first corner 360 of the spring plate 32, a second motor 320B is configured to move a second linkage system 324B coupled to a second corner 362 of the spring plate 32, and a third motor 320C is configured to move a third linkage system 324C coupled to a third corner 364 of the spring plate 32. The vehicle controller 14 may control the motors 320 to coordinate movement of the corners 360, 362, 364 so as to control movement of the spring plate 32 relative to the actuator plate 70.

Controlling the spring plate 32 via three motors 320 may enable greater control of the movement of the spring plate 32 as compared to controlling the spring plate 32 via two motors 320. As an example, in addition to pitching and/or rolling the spring plate 32 relative to the actuator plate 70, the vehicle controller 14 may translate the spring plate 32 along an axis parallel to the vertical axis 72, such as to heave the spring plate 32. In some embodiments, the vehicle controller 14 may control the motors 320 in order to move each of the corners 360, 362, 364 to a respective target position. For instance, the vehicle controller 14 may control the motors 320 to cause each of the corners 360, 362, 364 to move substantially equal distances along a respective axis parallel to the vertical axis 72 in order to translate the spring plate 32 along an axis parallel to the vertical axis 72 without rolling and/or pitching the spring plate 32.

Although the embodiment illustrated in FIG. 7 includes two motors 320 and two linkage systems 322 and the embodiment illustrated in FIG. 8 includes three motors 320 and three linkage systems 322, in additional or alternative embodiments, any other suitable number of motors 320 and linkage systems 322 may be used to control movement between the spring plate 32 and the actuator plate 70. By way of example, a single motor 320 and a single corresponding linkage system 322 may be used, or more than three motors 320 and more than three corresponding linkage systems 322 may be used. Indeed, the number of motors 320 and corresponding linkage systems 322 used to control movement of the spring plate 32 may be based on a shape of the spring plate 32 (e.g., four motors 320 and four linkage systems 322 to move respective corners of a spring plate 32 having a rectangular shape) and/or a desirable amount of movement (e.g., a number of degrees of freedom) of the spring plate 32 relative to the actuator plate 70. Furthermore, it should be noted that a combination of motors 320, linkage systems 322, and springs 34 may be used to control movement between the spring plate 32 and the actuator plate 70. Further still, any of the techniques described above may also be used to cause other types of movement of the spring plate 32, such as translational movement along an axis parallel to the horizontal axis 160.

Figure 9:
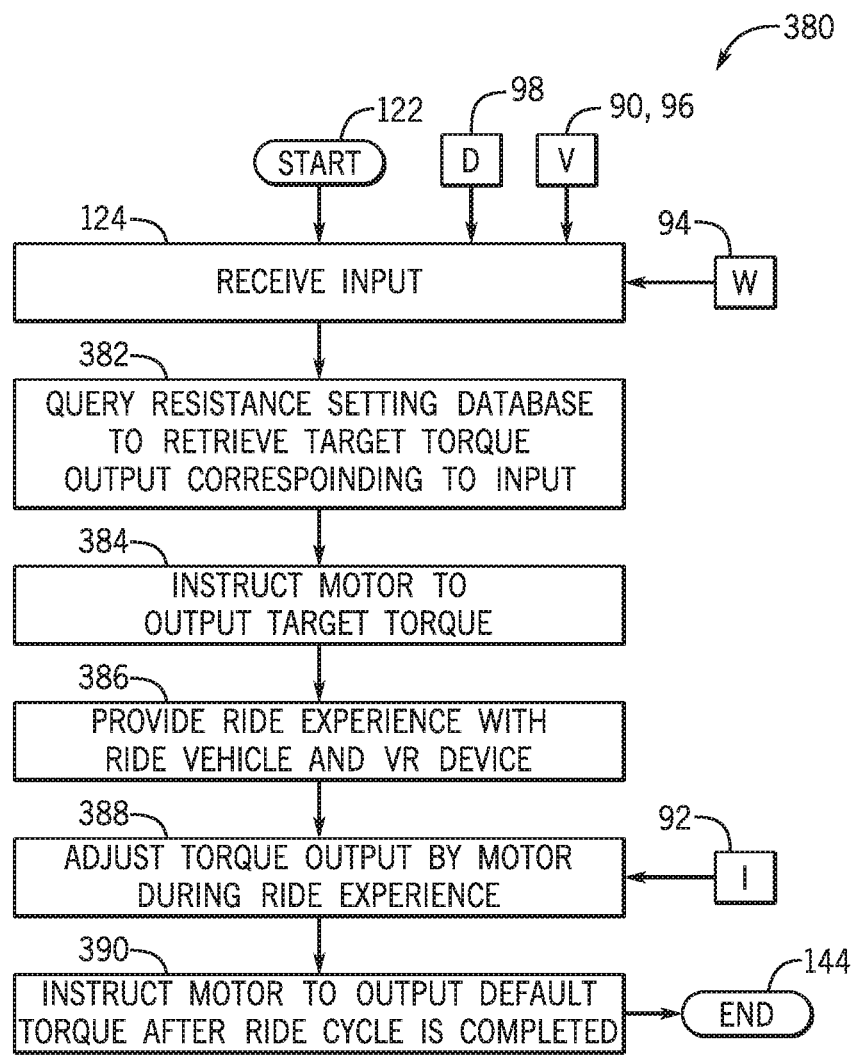
FIG. 9 is a flow diagram of an embodiment of a process by which the resistance control system may adjust operation of the stationary ride vehicle of FIG. 1 via motors, in accordance with embodiments of the present disclosure.

FIG. 9 is a flow diagram illustrating an embodiment of a process 380 for controlling the ride vehicle 16 via the motors 320 through a ride cycle of the amusement attraction 10. The process 380 may also be representative of initiated code or instructions stored in a non-transitory computer-readable medium, such as for execution by the processor 100 of the vehicle controller 14 of the resistance control system 12. Certain steps illustrated in the process 380 may be similar to steps described above with respect to the process 120. Further, additional steps may be performed, and/or certain steps depicted in FIG. 9 may be omitted, modified, or performed in different order, where appropriate.

During performance of the process 380, the vehicle controller 14 may also start (block 122) a ride cycle by receiving (block 124) an input. The input may include a weight from the weight sensor 94, an image or identifier from the visual sensor 96, and/or a user input from the input device 98. The vehicle controller 14 then queries (block 382) the resistance setting database 104 to retrieve a target torque output that corresponds to the input. Indeed, the resistance setting database 104 may include entries or algorithms associating respective torque outputs with various data or parameters, and the vehicle controller 14 may utilize the input to identify a suitable torque output for each motor 320. By way of example, the torque output may be increased for heavier rider weights than for lighter rider weights and/or for more relaxed experiences than for challenging experiences to increase movement resistance of the ride vehicle 16. After identifying the target torque output, the vehicle controller 14 controls, operates, or instructs (block 384) the motors 320 to output the target torque.

After calibrating the torque output by the motors 320, the vehicle controller 14 provides (block 386) a ride experience to the rider 22 through the ride vehicle 16, and the ride experience may correspond to the virtual experience provided by the VR device 24, using a technique similarly described above. As an example, the images presented by the VR device 24 may correspond with the movement of the spring plate 32 relative to the actuator plate 70 (e.g., based on a force imparted by the rider 22 against the torque output by the motors 320). Further, the vehicle controller 14 may adjust (block 388) the torque output by the motors 320 during the ride experience so as to correspond with the virtual environment presented by the VR device 24 to the rider 22. In an example, the vehicle controller 14 may receive a haptic feedback request from the VR controller 26, and the vehicle controller 14 may adjust the torque output based on the haptic feedback request (e.g., to fulfill the haptic feedback request). In another example, the vehicle controller 14 may automatically adjust the torque output based on a time during the ride experience or a signal corresponding to an aspect of the ride experience (e.g., a narrative change in the VR experience). Indeed, the vehicle controller 14 may instruct the motors 320 to adjust the torque output to change the resistance of movement between the spring plate 32 and the actuator plate 70 and/or to transition between operating in the semi-passive mode, in which the rider 22 may primarily drive movement of the spring plate 32, and the active mode, in which the motors 320 may primarily drive movement of the spring plate 32. In a further example, the vehicle controller 14 may adjust the torque output based on an orientation of the spring plate 32 relative to the actuator plate 70. For instance, the vehicle controller 14 may instruct the motors 320 to increase the torque output in response to receiving sensor data (e.g., from the inclinometer 92) indicative of the inclination angle 200 being greater than a threshold angle in order to block movement of the spring plate 32 that would further increase the inclination angle 200.

After the ride cycle has been completed, the vehicle controller 14 may instruct (block 390) the motors 320 to output default torques to end (block 144) the process 120. The default torque may enable a particular positioning or orientation of the spring plate 32 (e.g., relative to the actuator plate 70) and/or may set a resistance of movement between the spring plate 32 and the actuator plate 70 to facilitate dismounting from the ride vehicle 16. For instance, the default torque may substantially increase the resistance of movement of the spring plate 32 to avoid movement relative to the actuator plate 70 as caused by forces imparted by the rider 22 while dismounting from the ride vehicle 16 to facilitate the rider 22 with exiting from the ride vehicle 16.

As such, technical effects of the disclosed resistance control system include enabling selective adjustment of a tension or weight resistance of a ride vehicle. The ride vehicle therefore accommodates a wide range of rider parameters or preferences to experience a stationary attraction via VR devices. Generally, a rider provides input to a VR system of the stationary attraction by leaning or shifting his or her weight relative to the ride vehicle. The ride vehicle is operated to appropriately resist the movement to simulate a virtual experience that is delivered through the VR device. In some embodiments, a spring plate of the ride vehicle is supported by a pivot joint that enables the rider to manipulate the spring plate with his or her bodyweight. The ride vehicle includes at least one spring coupled to a surface of the spring plate to selectively compress against an actuator plate disposed underneath the spring plate. The actuator plate is vertically positioned relative to the spring plate via at least one actuator, which may move the actuator plate up or down to respectively increase or decrease resistance of the resistance control system to movements of the rider. Thus, during a normal ride cycle, the resistance control system may receive an input indicative of a parameter associated with the rider and instruct the actuators to tension the springs to a predetermined setting that corresponds to the parameter. In other embodiments, compound or conical springs positioned in a column and coupled to the spring plate may be passively compressed by the rider to a target height, thereby providing a target resistance to movements of the rider. In further embodiments, the ride vehicle may include at least one back-drivable motor that is coupled to the spring plate and that outputs a torque to control resistance of movement between the spring plate and the actuator plate, such as in response to a force that overcomes the output torque to back-drive the motor. For example, the resistance control system may adjust the output torque to increase or decrease resistance of movement of the spring plate based on a received input. The motor may also be controlled to output a torque causing the spring plate to be actively driven and moved. In any case, the disclosed system provides an improved experience for guests of a wider range of weights, preferences, and other parameters.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A resistance control system for a passenger support of an amusement attraction, the resistance control system comprising:
a first foundation;
a second foundation configured to receive a force exerted by a passenger of the amusement attraction;
a support extending between the first foundation and the second foundation, wherein the second foundation is pivotably coupled to the support at a pivot joint;
a motor;
a linkage system coupled to the motor and to the second foundation such that the motor is configured to output a torque to adjust, via the linkage system, a resistance to movement of the second foundation about the pivot joint and relative to the first foundation; and
a controller communicatively coupled to the motor, wherein the controller is configured to instruct the motor to output the torque to adjust the resistance to movement of the second foundation based on the force exerted by the passenger and imparted onto the second foundation.

2. The resistance control system of claim 1, wherein the linkage system comprises a bracket coupled to a linkage, the linkage is coupled to the second foundation, and the motor is configured to output the torque to drive rotation of the bracket to impart a counter force onto the second foundation via the linkage to adjust the resistance to movement of the second foundation about the pivot joint.

3. The resistance control system of claim 2, wherein the linkage is rotatably coupled to the bracket.

4. The resistance control system of claim 1, wherein the controller is communicatively coupled to a virtual reality (VR) controller, and the controller is configured to instruct the motor to output the torque based on an input received from the VR controller.

5. The resistance control system of claim 1, wherein the motor is configured to output the torque to pitch, roll, translate, or any combination thereof, the second foundation relative to the first foundation.

6. The resistance control system of claim 1, comprising an additional motor coupled to the linkage system, wherein the motor and the additional motor are back-drivable motors.

7. A resistance control system for a ride vehicle of an amusement attraction, the resistance control system comprising:
a first foundation;
a second foundation coupled to a pivot joint and configured to move relative to the first foundation via the pivot joint, wherein the second foundation is configured to receive a force exerted by a passenger of the amusement attraction;
a motor configured to drive movement of the second foundation via a linkage system; and
a controller communicatively coupled to the motor, wherein the controller is configured to receive an input and to instruct the motor to output a torque based on the input to adjust a resistance to movement of the second foundation about the pivot joint and relative to the first foundation, and the input comprises the force imparted onto the second foundation by the passenger of the amusement attraction.

8. The resistance control system of claim 7, comprising a sensor communicatively coupled to the controller, wherein the input comprises sensor data transmitted by the sensor.

9. The resistance control system of claim 8, wherein the sensor is a position sensor, a weight sensor, a visual sensor, or any combination thereof.

10. The resistance control system of claim 7, comprising an input device communicatively coupled to the controller, wherein the input comprises a user input received via the input device.

11. The resistance control system of claim 7, wherein the controller comprises a memory storing a resistance setting database, and the controller is configured to query the resistance setting database to determine a target torque based on the input and to instruct the motor to output the target torque.

12. The resistance control system of claim 7, wherein the controller is configured to instruct the motor to increase the torque to drive movement of the second foundation about the pivot joint and relative to the first foundation.

13. The resistance control system of claim 7, wherein the controller is communicatively coupled to a virtual reality (VR) controller, and the input comprises a signal transmitted by the VR controller.

14. An amusement attraction comprising:
- a virtual reality (VR) device comprising a VR controller, wherein the VR controller is configured to instruct the VR device to present an image;
- a ride vehicle comprising:
  - a first foundation;
  - a second foundation;
  - a support extending between the first foundation and the second foundation, wherein the support is pivotably coupled to the second foundation via a pivot joint such that the second foundation is configured to move relative to the first foundation via the pivot joint; and
  - a motor configured to drive movement of the second foundation relative to the first foundation via the pivot joint or a linkage system coupled to the second foundation, wherein the motor is back-drivable; and
- a vehicle controller communicatively coupled to the VR controller and to the motor, wherein the vehicle controller is configured to instruct the motor to output a torque based on communication between the vehicle controller and the VR controller.

15. The amusement attraction of claim 14, wherein the VR controller is configured to instruct the VR device to present a virtual environment comprising the image, and the vehicle controller is configured to instruct the motor to output the torque to correspond to the virtual environment presented by the VR device.

16. The amusement attraction of claim 14, wherein the vehicle controller is configured to receive a signal indicative of movement of the second foundation relative to the first foundation, and the vehicle controller is configured to instruct the VR controller to adjust the image presented by the VR device based on the signal.

17. The amusement attraction of claim 14, wherein the vehicle controller is configured to operate in a semi-passive mode to instruct the motor to output the torque to adjust a resistance to movement of the second foundation about the pivot joint and relative to the first foundation.

18. The amusement attraction of claim 14, wherein the vehicle controller is configured to operate in an active mode to instruct the motor to output the torque to drive movement of the second foundation about the pivot joint and relative to the first foundation.

19. The amusement attraction of claim 14, wherein the vehicle controller is configured to receive a haptic feedback request from the VR controller, and the vehicle controller is configured to instruct the motor to output the torque to fulfill the haptic feedback request.

20. The amusement attraction of claim 14, wherein the second foundation is configured to receive a force exerted by a passenger of the amusement attraction, and the vehicle controller is configured to instruct the motor to output the torque to adjust a resistance to movement of the second foundation about the pivot joint and relative to the first foundation based on the force imparted onto the second foundation.

* * * * *